(12) United States Patent
Ur

(10) Patent No.: US 9,257,089 B2
(45) Date of Patent: Feb. 9, 2016

(54) AUGMENTED REALITY PRESENTATIONS

(75) Inventor: Shmuel Ur, Galil (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/380,301

(22) PCT Filed: Feb. 25, 2011

(86) PCT No.: PCT/US2011/026344
§ 371 (c)(1),
(2), (4) Date: Dec. 22, 2011

(87) PCT Pub. No.: WO2012/115657
PCT Pub. Date: Aug. 30, 2012

(65) Prior Publication Data
US 2012/0218297 A1    Aug. 30, 2012

(51) Int. Cl.
*G09G 5/00* (2006.01)
*G09G 5/14* (2006.01)
*H04N 21/258* (2011.01)
*H04N 21/262* (2011.01)
(Continued)

(52) U.S. Cl.
CPC .. *G09G 5/00* (2013.01); *G09G 5/14* (2013.01); *H04N 21/25883* (2013.01); *H04N 21/25891* (2013.01); *H04N 21/2668* (2013.01); *H04N 21/26258* (2013.01); *H04N 21/4113* (2013.01); *H04N 21/4316* (2013.01); *G06T 19/006* (2013.01); *G09G 2340/12* (2013.01); *G09G 2340/14* (2013.01); *G09G 2354/00* (2013.01)

(58) Field of Classification Search
CPC ........ G06T 19/006; G06T 19/00; G06F 3/011
USPC .......................................................... 345/633
See application file for complete search history.

(56) References Cited

U.S. PATENT DOCUMENTS 6,661,433 B1 * 12/2003 Lee ............................... 715/764
6,963,898 B2 * 11/2005 Yoshimine et al. ........... 709/203
(Continued)

FOREIGN PATENT DOCUMENTS

CN             1682273 A     10/2005
KR    1020050109719 A     11/2005
(Continued)

OTHER PUBLICATIONS

Augmented Reality Tatoo Makes Your Skin Come Alive, Mashable, Social Media, © 2005-2013 Mashable, Inc., http://mashable.com/2010/02/17/augmented-reality-tattoo/ [last accessed May 1, 2013].
(Continued)

*Primary Examiner* — James A Thompson
*Assistant Examiner* — Tapas Mazumder
(74) *Attorney, Agent, or Firm* — Brundidge & Stanger, P.C.

(57) ABSTRACT

Technology is generally disclosed for augmented-reality presentations. In some embodiments, the technology can receive an indication of a user's sensitivity to an aspect of a presentation, receive general content relating to the presentation, receive overlay content relating to the presentation, combine the received general content and the received overlay content to create the presentation, and render the presentation. The overlay content may respond to the user's sensitivity.

34 Claims, 11 Drawing Sheets

(51) Int. Cl.
*H04N 21/2668* (2011.01)
*H04N 21/41* (2011.01)
*H04N 21/431* (2011.01)
*G06T 19/00* (2011.01)

(56) References Cited

U.S. PATENT DOCUMENTS

| | | | |
|---|---|---|---|
| 2002/0131511 A1* | 9/2002 | Zenoni | 375/240.28 |
| 2003/0023757 A1* | 1/2003 | Ishioka et al. | 709/246 |
| 2003/0078972 A1 | 4/2003 | Tapissier et al. | |
| 2005/0257242 A1 | 11/2005 | Montgomery et al. | |
| 2006/0095410 A1 | 5/2006 | Ostrover et al. | |
| 2006/0130119 A1* | 6/2006 | Candelore et al. | 725/135 |
| 2007/0223830 A1* | 9/2007 | Ono | 382/254 |
| 2007/0273711 A1* | 11/2007 | Maffei | 345/630 |
| 2008/0068507 A1* | 3/2008 | Krause et al. | 348/570 |
| 2009/0141939 A1* | 6/2009 | Chambers et al. | 382/103 |
| 2009/0196574 A1 | 8/2009 | Lidestri | |
| 2010/0066751 A1* | 3/2010 | Ryu et al. | 345/581 |
| 2010/0158358 A1* | 6/2010 | Lienhart et al. | 382/162 |
| 2011/0066706 A1 | 3/2011 | Ostrover et al. | |
| 2011/0107238 A1* | 5/2011 | Liu et al. | 715/756 |
| 2011/0119058 A1* | 5/2011 | Berard et al. | 704/235 |
| 2011/0295851 A1* | 12/2011 | El-Saban et al. | 707/728 |

FOREIGN PATENT DOCUMENTS

| | | |
|---|---|---|
| KR | 10-0655452 | 12/2006 |
| WO | 2009073978 A1 | 6/2009 |

OTHER PUBLICATIONS

Silent Disco, Wikipedia, http://en.wikipedia.org/wiki/Silent_disco [last accessed May 1, 2013].

Three Reasons Why 3D TV and Movies Will Help Augmented Reality, The Future Digital Life, Thomas K. Carpenter, May 25, 2010.

Yarwood, Bob, "Virtual Space—The Future of Movies and Video Games," May 2009, Local Host Virtual Space.

International Search Report, PCT/US11/26344, dated Apr. 19, 2011, 2 pages.

* cited by examiner

AUGMENTED REALITY PRESENTATIONS

CROSS-REFERENCE TO RELATED APPLICATION

This Application is the National Stage filing under 35 U.S.C. §371 of PCT Application Ser. No. PCT/US11/26344 filed on Feb. 25, 2011. The disclosure of the PCT Application is hereby incorporated herein by reference in its entirety.

BACKGROUND

Groups of people attend various types of presentations together. As an example, a group of acquainted people (e.g., friends, colleagues, etc.) or related people (e.g., families) sometimes attend various presentations together. Presentations can be prerecorded or live, and can be audiovisual (e.g., movies, television shows, etc.) or primarily audio (e.g., music concerts, comedy shows, etc.).

Members of the group may have different sensitivities to aspects of presentations, e.g., nudity, alcohol, offensive language, sex, violence, etc. As an example, a devout follower of a particular religion may be sensitive to depictions of use of alcohol, or a young child may be sensitive to scenes containing nudity or foul language. To alert audiences to content, some types of presentations may be rated, e.g., to indicate that audiences of various sensitivities should not attend or by law cannot attend. In some jurisdictions, a censorship authority may even censor presentations so that scenes containing problematic content are removed, thereby lowering a sensitivity threshold for the presentation.

When a group of people desire to attend a particular presentation together, they may need to consider the sensitivities of each member of the group. As an example, a family may by necessity attend a movie suitable for the youngest member of the family. As another example, a group of people having at least one member of a particular religion may need to avoid stage performances depicting heavy use of alcohol or lewd behavior.

Members of groups may also have people with varying proficiencies in natural languages. As an example, some members of the group may prefer to view performances in a first language, but others may prefer a second language. Commonly, the presentation may provide the first language audibly and the second language visually with some type of captioning, e.g., "subtitles."

When a group includes people with heterogeneous sensitivities or language proficiencies, it can be difficult to select a suitable performance to attend together. As examples, a family may have a limited selection of movies it can watch together and a group of colleagues may have a limited set of stage performances they can attend together.

SUMMARY

Technology is disclosed for augmented-reality presentations. The technology can receive an indication of a user's sensitivity to an aspect of a presentation, receive general content relating to the presentation, receive overlay content relating to the presentation, combine the received general content and the received overlay content to create the presentation, and render the presentation. The overlay content may respond to the user's sensitivity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
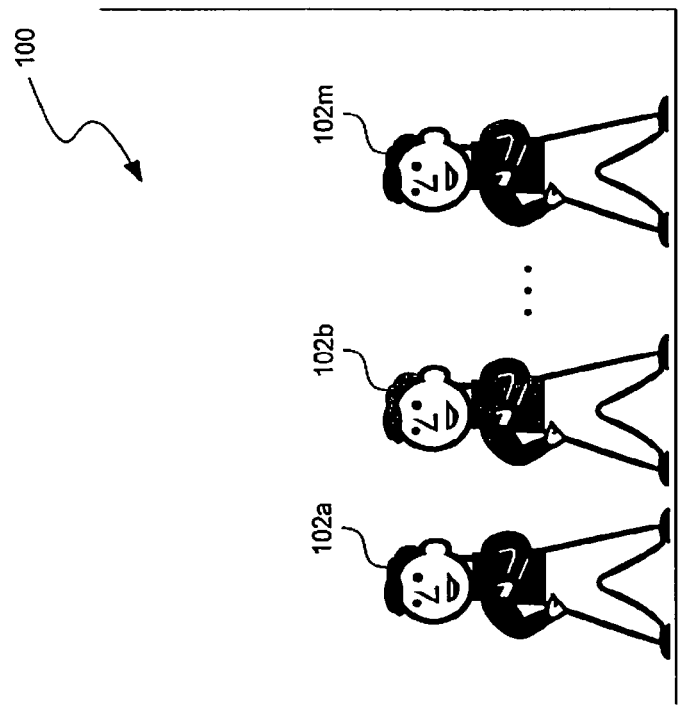
FIG. 1 is a block diagram illustrating an environment in which the technology may operate in some embodiments.
Figure 1:
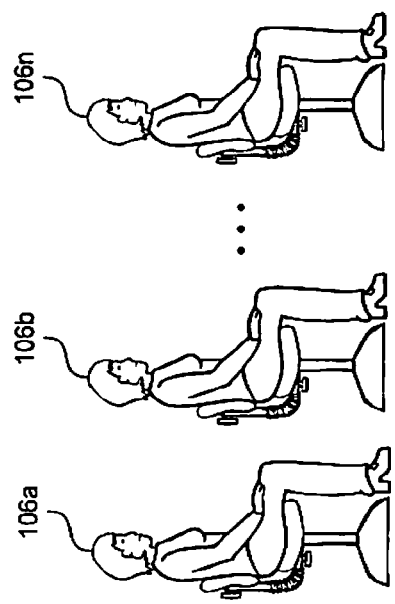

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is disclosed for enabling augmented reality presentations ("the technology"). In various embodiments, the technology enables a group of people to attend a presentation together, but experience different presentations suitable for their sensitivities and/or language proficiencies. Each member of the group ("user," "viewer," or "audience member") who has a different sensitivity or language proficiency could employ an augmented reality audiovisual device while attending a presentation. Various computing devices then adapt the presentation to respond to that particular user's sensitivities or preferred language. The adaptation may employ previously recorded content or dynamically generated content. As an example, when a user who is sensitive to nudity attends a prerecorded presentation, e.g., a movie, that includes a nude actor, the technology may cover the nudity with clothing so that the actor is no longer nude or only semi-nude. Alternatively, the technology may obfuscate the nudity, e.g., by drawing a black figure over the nude portions of the actor or by defocusing those portions. As another example, when a user who is sensitive to depictions of alcohol attends a presentation including use of alcohol, the technology may render the alcohol (visually and/or audibly) as juice or some other liquid. The technology may render the liquid as a different color and replace relevant words in the audible portion of the presentation with references to non-alcoholic liquid. As yet another example, the technology may add nudity to a scene. When two actors are intimate with each other during a performance, the technology may cause the actors to appear to be nude even though the actors may be fully clothed. As yet another example, the technology may cause the presentation to appear to be in a second language even though actors may be speaking a first language.

The technology can employ existing components to assist in rendering content, including combined content of a presentation. As examples, the technology can employ augmented reality tools and techniques, e.g., display devices, software to digitally manipulate images and speech, etc. An example of an augmented reality audiovisual device is a specially adapted headset or goggles. A VUZIX brand of glasses is a specific commercially available augmented reality audiovisual device that may be adapted for use with the technology. The VUZIX glasses include a visual rendering device for rendering video content and headphones for rendering audio content. Various types of augmented reality audiovisual devices can be opaque (e.g., so that only content rendered on the device can be seen by the user) or transparent (e.g., so that live content can have superimposed on it other content). The augmented reality audiovisual device can include one or more cameras so that it can collect video images of whatever the user is seeing and provide those images to a computing device. The augmented reality audiovisual device can also include one or more sensors, e.g., to detect position and orientation of the augmented reality audiovisual device as compared to the subjects (e.g., actors) that the user is seeing.

When a user attends a presentation, the user may be provided an augmented reality audiovisual device or users may bring their own augmented reality audiovisual devices. The user may then indicate their sensitivities or preferences to the provider of the presentation. As an example, the user may alert an agent of the presenter to the user's sensitivities and/or preferences. Alternatively, the agent may identify content rating level appropriate for the user, e.g., based on the user's age.

During the presentation, a computing device can monitor what the user is seeing, e.g., by receiving images from one or more cameras or other sensors associated with the augmented reality audiovisual device, hearing, or both. The computing device can then retrieve and render alternate content, e.g., to respond to the user's sensitivities and/or preferences. As examples, the computing device may retrieve previously stored content that is appropriate to respond to the user's sensitivities and/or preferences. Thus, the technology may combine general content with overlay content suitably responding to various user sensitivities and/or preferences. The overlay content can be previously stored or digitally generated, e.g., based on stored graphics data that digitally describes various objects (e.g., clothes).

Augmented reality technology presently exists to aid pilots. As examples, technology is employed by pilots of military and commercial aircraft to depict on "heads-up" displays various parameters associated with flight, terrain maps, and so forth. As an example, when a pilot is descending through clouds or in darkness, the heads-up display can render nearby terrain (e.g., mountains, antennae, etc.). Heads-up technology that combines digitally generated content with what pilots view in the real-world has been available since the 1960's. "Enhanced flight systems" and "synthetic vision systems" include a combiner, which is a computing device that combines digitally stored content (e.g., terrain information) with what the pilot is viewing in the real-world (e.g., using cameras). This technology combines real-world information (e.g., as scanned using a camera) with previously stored or digitally generated data. The technology disclosed herein can employ similar technology to combine what the user is viewing with digitally generated or previously stored content.

In various embodiments, the technology may transform the previously stored or digitally generated content that is retrieved for combining, e.g., so that the content can be properly combined. As an example, when the subject (e.g., actor) over which other content to be rendered is rotated in a particular orientation, the content to be rendered may also need to also be rotated appropriately. More specifically, if clothing is to be digitally added (e.g., "combined") over a nude actor, the clothing would need to be appropriately rotated. Otherwise, the combined image may look awkward.

In various embodiments, the technology enables users to indicate various preferences other than language, e.g., actor, clothing or cultural style, level of nudity, level of lewd language, etc. The technology can adapt to these preferences, e.g., by overlaying actors' voices and/or faces, adding or removing clothing, adding or removing language, etc.

In some embodiments, the technology may be adapted for use in airplanes so that, for example, a movie can have different versions that respond to users' sensitivities and/or preferences.

The technology will now be described with reference to the figures.

FIG. 1 is a block diagram illustrating an environment in which the technology may operate in some embodiments. An area 100 may be occupied by subjects, e.g., actors, stage or movie props, dummies, etc. The illustrated area 100 is occupied by actors 102a, 102b, and 102m. The area 100 can be a stage, a projection screen, a television, or any other device or medium that may be used to provide presentations, e.g., to an audience comprising audience members 106a, 106b, and 106n.

Figure 2:
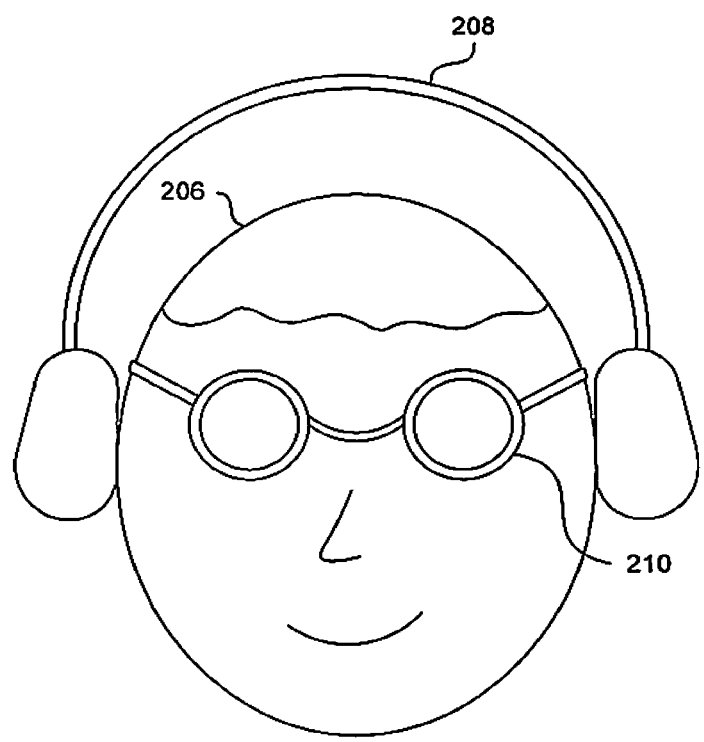
FIG. 2 is a schematic diagram illustrating a close up view of an audience member.

FIG. 2 is a schematic diagram illustrating a close up view of an audience member, e.g., the audience member 106a of FIG. 1. A head 206 of the audience member is illustrated with a headset or other audio reception device 208 and a set of goggles or other video reception device 210. In various embodiments, the audio reception device 208 may be integrated with the video reception device 210. The audio reception device 208 can playback audible portions of presentations and the video reception device 210 can play back visible portions of presentations. The audio reception device 208 can be implemented as headphones, earphones, speakers, etc. The video reception device can be implemented as LCD displays, projection devices, etc. The technology may enable the audio reception device 208 and the video reception device 210 to receive signals via a wired or wireless network, Bluetooth, or other communications means.

Figure 3:
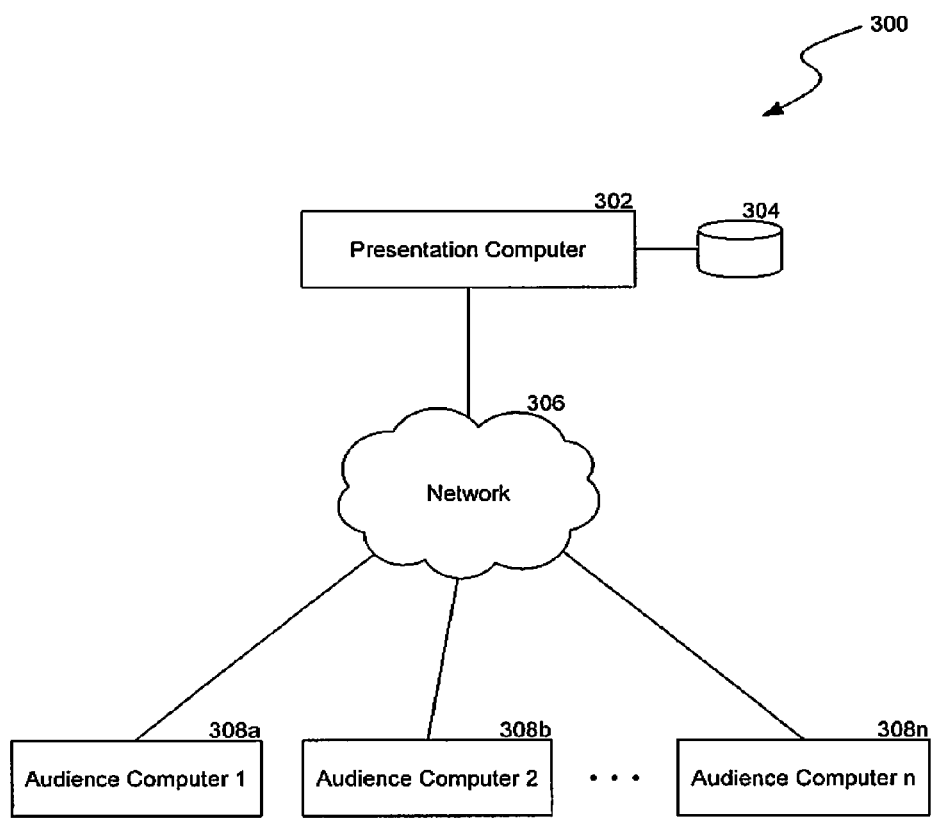
FIG. 3 is a block diagram illustrating an environment in which the technology may operate in various embodiments.

FIG. 3 is a block diagram illustrating an environment 300 in which the technology may operate in various embodiments. The environment 300 can include a presentation computer 302 which may be communicably coupled with a storage device 304. The presentation computer may provide aspects of the presentation, e.g., via a network 306 to one or more audience computing devices, e.g., audience computer 1, 308a, audience computer 2, 308b, or audience computer n, 308n. The presentation computer 302 may retrieve portions of the presentation from the storage device 304. The audience computing devices may also be communicably coupled with one or more storage devices (not illustrated). In various embodiments, the presentation computer and/or the audience computers may combine general and overlay content to produce a presentation that is adapted for a particular user's sensitivities and/or preferences.

Figure 4:
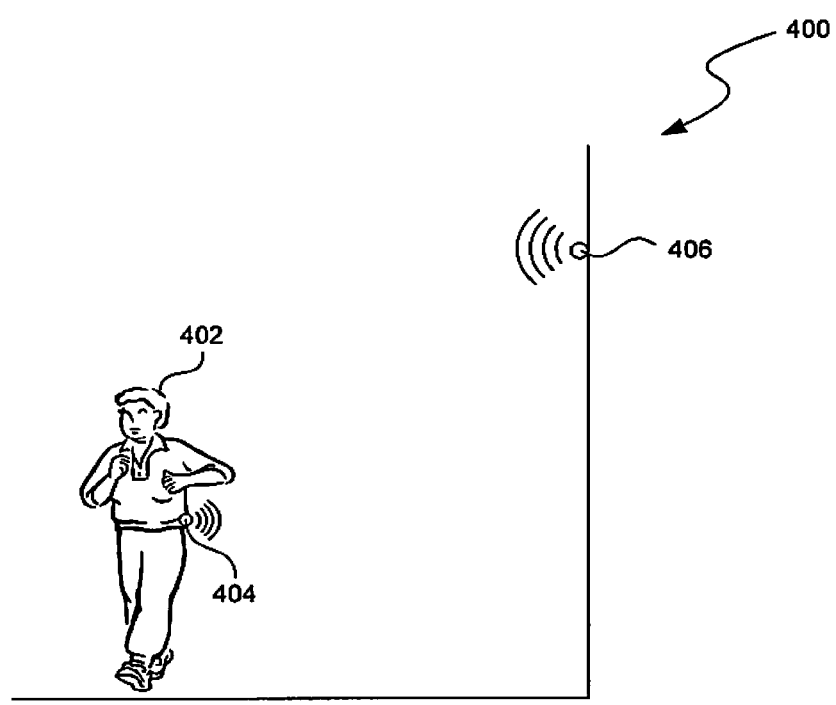
FIG. 4 is a schematic diagram illustrating a presentation area in various embodiments.

FIG. 4 is a schematic diagram illustrating a presentation area 400 in various embodiments. The presentation area 400 may include an actor or other subject 402. The actor or subject 402 may have associated therewith a position communications device, e.g., position communications device 404 to communicate the position of the subject. As an example, the device 404 may communicate its position relative to a different, stationary position communications device 406. The stationary position communications device 406 can identify a reference point, e.g., on a stage. By comparing a relative position between position communications device 404 associated with the subject 402 and the stationary position communications device 406, the technology may be able to accurately identify the position of the subject 402, e.g., on a stage. The presentation computer (discussed above in relation to FIG. 3) may receive the position of the subject 402 and other subjects (not illustrated) using corresponding position communications devices. The position communications devices may also sense the subject's orientation (e.g., using an accelerometer or other similar sensor) and transmit the orientation information so that overlay content can be appropriately transformed. As an example, the technology may transform clothing that needs to be added or liquid that needs to be replaced so that it is appropriately depicted based on the subject's orientation. Thus, the technology can be applied to augment reality during a live presentation, e.g., a stage performance. In various embodiments, the technology may transform the overlay content based one or more of the position of the subject, the orientation of the subject, and the position of the user or viewer.

Figure 5:
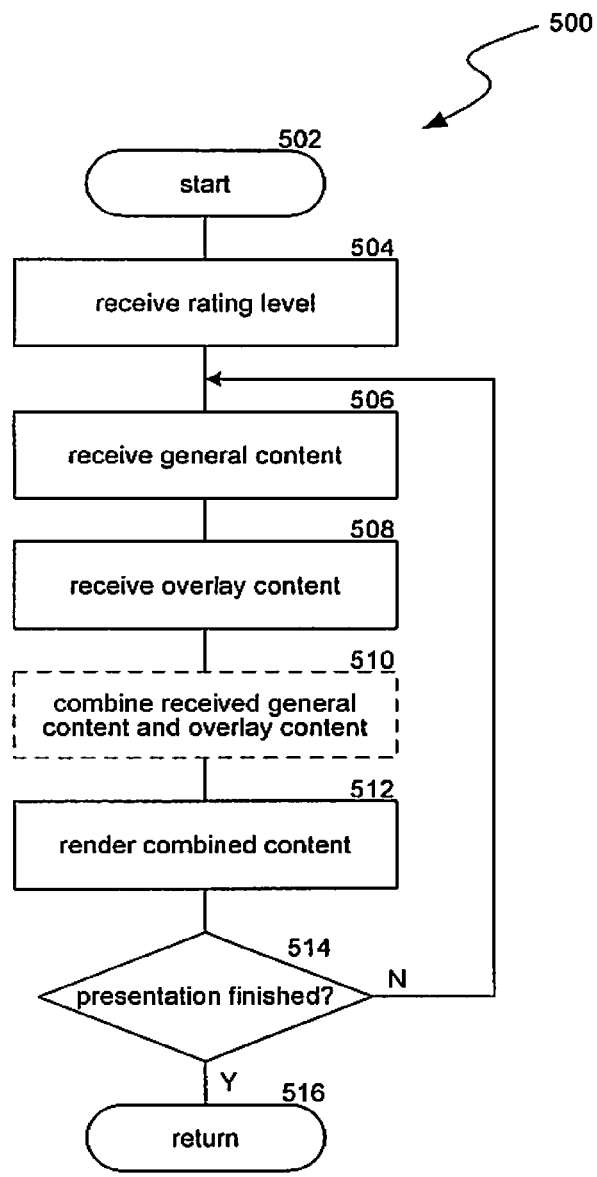
FIG. 5 is a flow diagram illustrating a routine that the technology may invoke in various embodiments.

FIG. 5 is a flow diagram illustrating a routine 500 that the technology may invoke in various embodiments. The routine 500 may be invoked by an audience computing device, and begins at block 502. The routine then continues at block 504. At block 504, the routine receives a rating level. As an example, the routine may receive a rating level from a user or a facility that is providing the presentation. The rating level can be based on the user's age, stated sensitivities, etc. As an example, a user who is above the age of majority may specify a rating of "R" meaning that the user can view any movie, but a user who is under the age 13 may only view movies rated "G" for General or rated "PG13" ("Parental Guidance required for children less than 13 years old") when the user is accompanied by a parent. The routine then continues at block 506. At block 506, the routine receives general content. As an example, the routine may receive general content from a server computing device or presentation computing device that pertains to a presentation. General content may be content that is transmitted to all users, irrespective of sensitivities or preferences. The routine then continues at block 508. At block 508, the routine receives overlay content. Overlay content may be content that the technology uses to adapt general content to respond to a user's sensitivities or preferences. The routine then continues at block 510. At block 510, the routine combines the received general content with the received overlay content. In various embodiments, instead of separately receiving general content and overlay content that needs to be combined, the routine may receive previously combined general and overlay content. The routine then continues at block 512. At block 512, the routine renders the combined content. The routine then continues at decision block 514. At decision block 514, the routine determines whether the presentation is finished. If the presentation is finished, the routine continues at block 516 where it returns. Otherwise, the routine continues at block 506. Thus, between blocks 506, 508, 510, and 512, the routine may receive and render a full presentation.

Those skilled in the art will appreciate that the logic illustrated in FIG. 5 and described above, and in each of the flow diagrams discussed below, may be altered in a variety of ways. For example, the order of the logic may be rearranged, sublogic may be performed in parallel, illustrated logic may be omitted, other logic may be included, etc.

Figure 6:
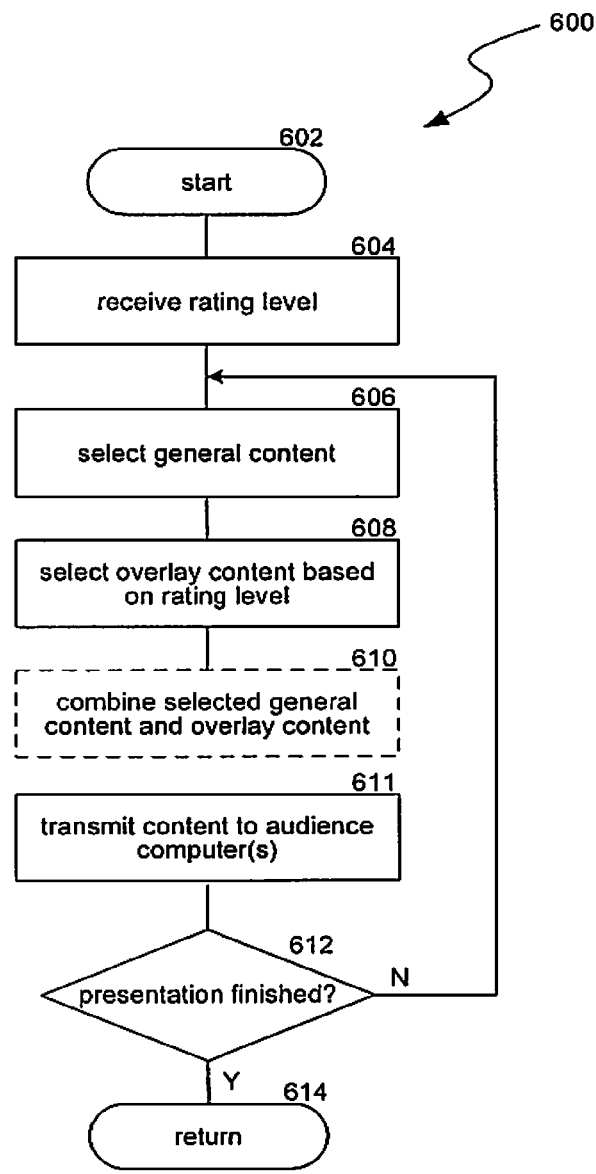
FIG. 6 is a flow diagram illustrating a routine invoked by the technology in various embodiments.

FIG. 6 is a flow diagram illustrating a routine 600 invoked by the technology in various embodiments. The routine 600 may be invoked by a presentation computing device, and begins at block 602. The routine then continues at block 604. At block 604, the routine receives a rating level. As an example, the routine may receive the rating level from an audience computing device indicating a rating that is appropriate for a user. The routine then continues at block 606. At block 606, the routine selects general content. As an example, the routine may select the general content pertaining to the presentation. The routine then continues at block 608. At block 608, the routine selects overlay content based on the received rating level. As an example, the routine may receive different rating levels for different users and select different overlay content corresponding to the received rating level. The routine then continues at block 610. At block 610, the routine combines the selected general content and the overlay content. In various embodiments, the routine may not combine the selected general content and the overlay content and instead provide sufficient information to an audience computing device to perform the combining. The routine then continues at block 611. At block 611, the routine transmits the content to the audience computing devices. As an example, the routine may transmit the combined selected general content and the overlay content to the audience computing device. Alternatively, the routine may transmit the selected general content and the selected overlay content to the audience computing devices to be combined. The routine then continues at decision block 612. At decision block 612, the routine determines if the presentation is finished. If the presentation is finished, the routine continues at block 614, where it returns. Otherwise, the routine continues at block 606. Thus, between block 606, 608, 610 and 611, the routine selects and transmits general and overlay content for a presentation.

Figure 7:
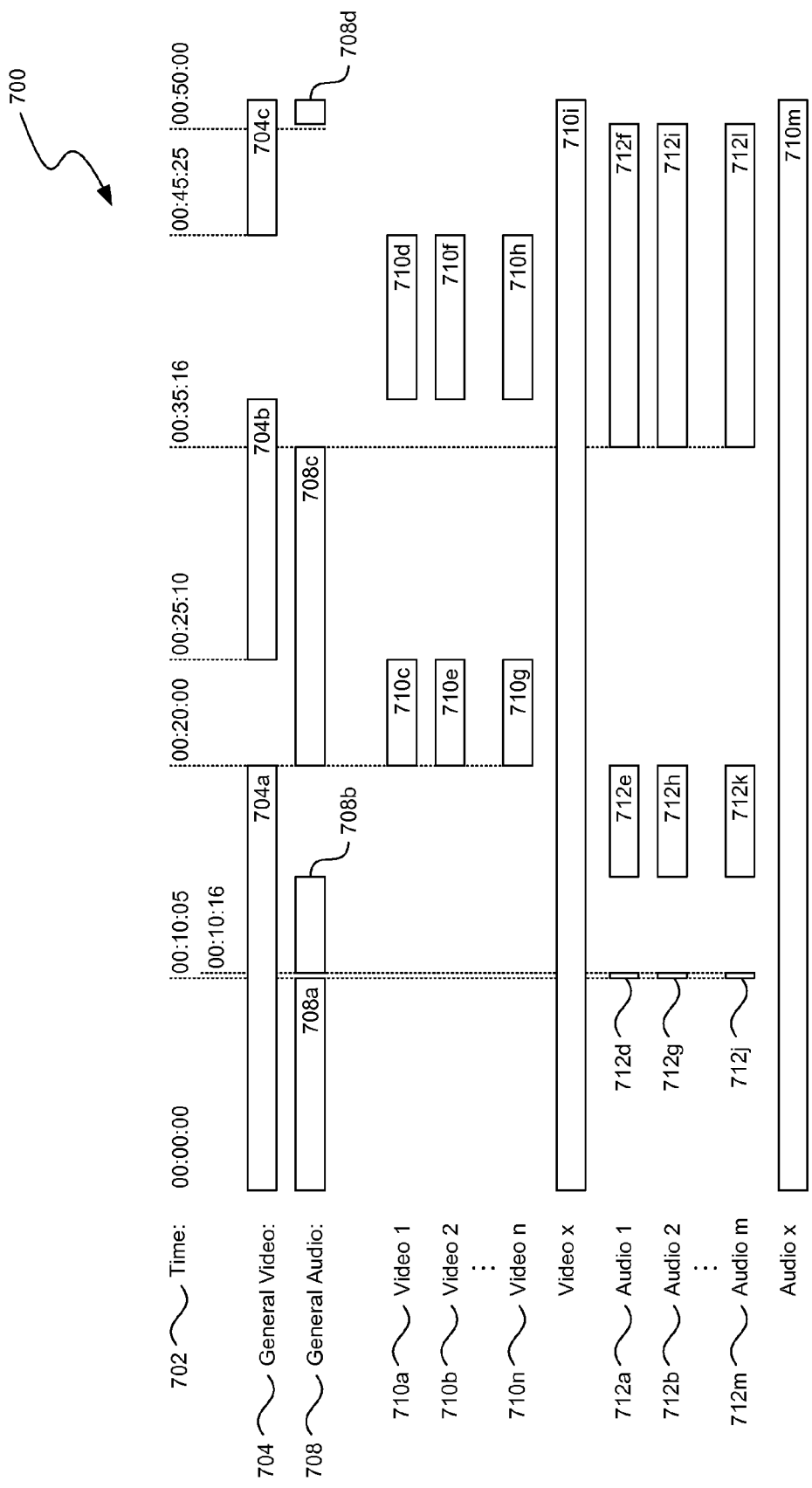
FIG. 7 is a schematic diagram illustrating a timeline.

FIG. 7 is a schematic diagram illustrating a timeline 700. The timeline 700 shows times 702, e.g., elapsed times from the beginning of a presentation. The timeline 700 also shows a general video segment 704 and a general audio segment 708. The general video segment 704 has a sub segment 704a that begins at time 00:00:00 and continues to time 00:20:00. The general video segment 704 has a sub segment 704b that begins at time 00:25:10 and a sub segment 704c that begins at time 00:45:25. The general video segment 708 has a sub segment 708a that begins at time 00:00:00 and continues to 00:10:05, sub segment 708b that begins at time 00:10:16 and continues to a time between time 00:00:00 and 00:20:00, sub segment 708c that begins at time 00:20:00 and continues to time 00:35:16, and a sub segment 708d that begins after time 00:50:00.

The timeline 700 also includes overlay video segments 710a-710h. Overlay video segments 710c, 710e, and 710g each correspond to general video segment 704 beginning at time 00:20:00. Each of the overlay video segments 710c, 710e, and 710g correspond to a different sensitivity or preference. As an example, overlay video segment 710e may add full clothing and overlay video segment 710g may add a bikini bottom but not a bikini top so that the subject appears semi-nude. Although general video segment 704 is shown with a gap at 00:20:00 where overlay video segments may be inserted, in various embodiments the general video segment may be continuous (e.g., depicted as video segment x 710*i*) and the overlay video segments are combined as a visual overlay effect rather than inserted as a replacement video segment. Similarly, overlay video segments 710*d*, 710*f*, and 710*h* correspond to general video segment 704, but begin at a different time. Overlay video segments 710*c* and 710*d* may be related in that they both relate to the same sensitivity or preference. Similarly, overlay video segments 710*e* and 710*f* may be related, and overlay video segments 710*g* and 710*h* may be related.

Similarly, audio segment rows 712*a*, 712*b*, and 712*m* represent audio segments that respond to various sensitivities or preferences. All overlay audio segments in a particular row may be related in that they all respond to the same sensitivity or preference. As an example, overlay audio segments 712*d*, 712*e*, and 710*f* may be related. The technology may also use multiple different general audio segments, e.g., for specific widely accepted preferences (e.g., language) and each overlay audio segment may respond to a particular sensitivity. As an example, general audio segment 704 may be audio in a different natural language than general audio segment 708.

Figure 8:
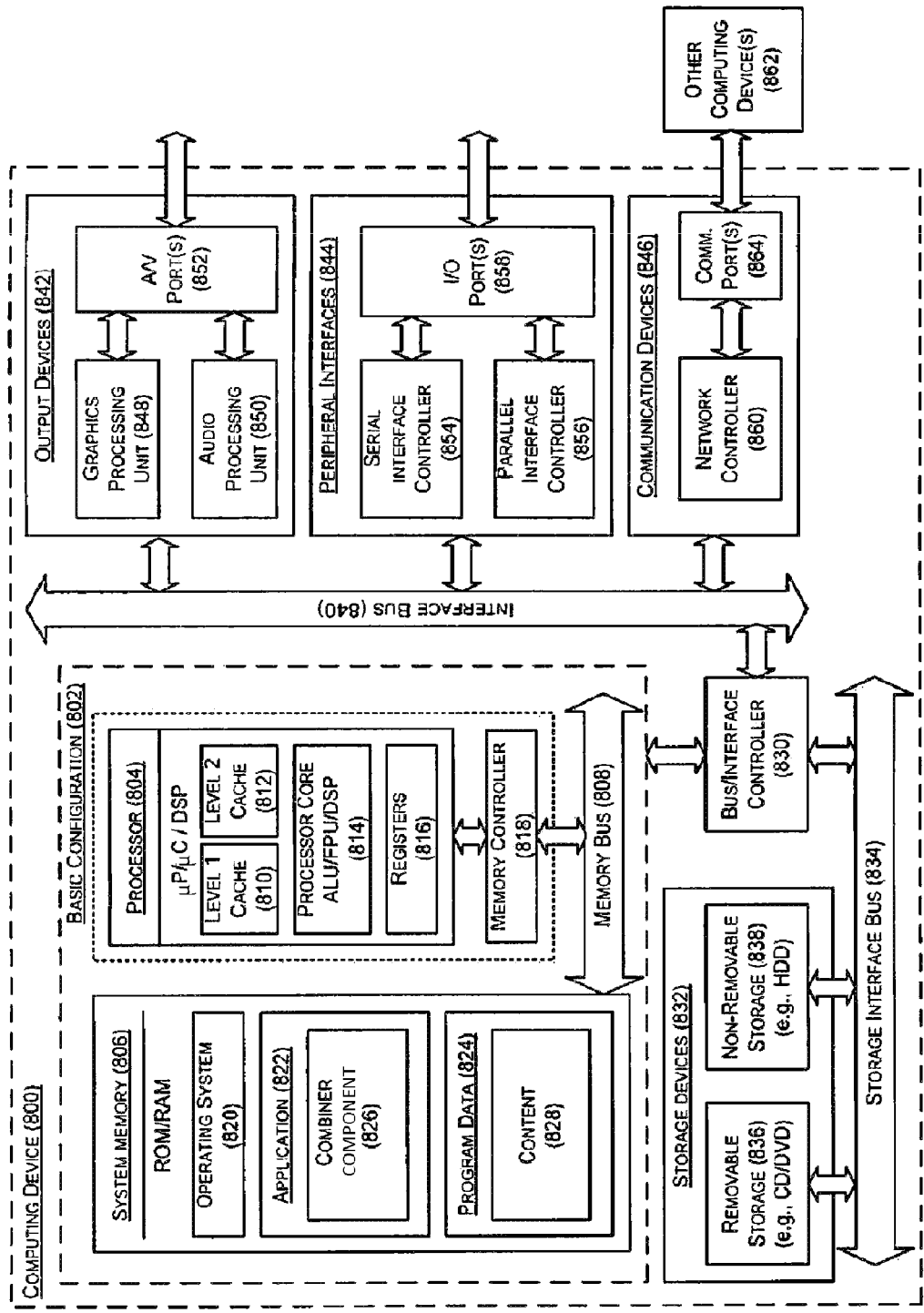
FIG. 8 is a block diagram of an illustrative embodiment of a computing device that is arranged for providing augmented reality presentations in accordance with at least some embodiments of the present disclosure.

FIG. 8 is a block diagram illustrating an example computing device 800 that is arranged for providing augmented reality presentations in accordance with at least some embodiments of the present disclosure. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a combiner component 826 that is arranged to combine general content (e.g., video or audio content) with overlay content (e.g., video or audio content that responds to various sensitivities or preferences). Program data 824 may include content 828 (e.g., audiovisual content, general content, overlay content, graphical content, etc.) that may be useful for generating presentations, as is described herein. In some embodiments, application 822 may be arranged to operate with program data 824 on operating system 820 such that augmented reality presentations are provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

Figure 9:
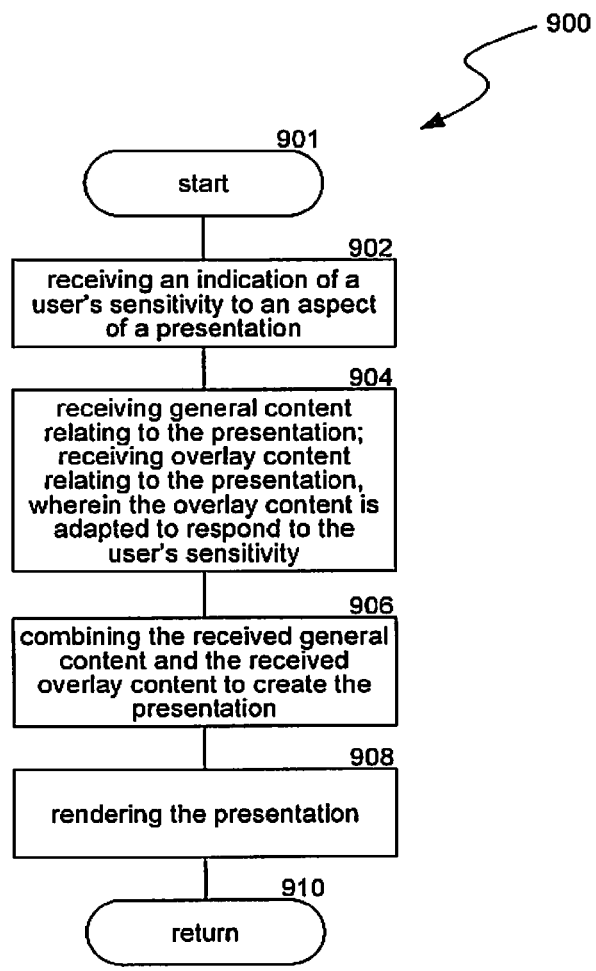
FIG. 9 is a flow diagram illustrating a method the technology may invoke in various embodiments.

FIG. 9 is a flow diagram illustrating a method 900 the technology may invoke in various embodiments. In various embodiments, the technology invokes the method 900, which may be performed by a computing system having a processor and a memory device, including: receiving an indication of a user's sensitivity to an aspect of a presentation (block 902); receiving general content relating to the presentation; receiving overlay content relating to the presentation, wherein the overlay content is adapted to respond to the user's sensitivity (block 904); combining the received general content and the received overlay content to create the presentation (block 906); and rendering the presentation (block 908). The method begins at block 901 and returns at block 910. Receiving the indication can include receiving a user's age and/or the user's preference. The preference can be one or more of a language or a rating. The language preference can relate to use of offensive language. The overlay content can include audio and/or video for the presentation. The combining can include digitally overlaying clothing over a subject, digitally removing clothing to cause a subject to appear to be nude or semi-nude, replacing some or all visual and audible suggestions of an alcoholic beverage with a non-alcoholic beverage, replacing a subject's face, replacing a subject's voice, and/or replacing a musical soundtrack so that a scene is less scary or more scary. The presentation can be a live presentation or a prerecorded presentation. Examples of live presentations are stage performances, e.g., comedy shows, theatrical productions, music concerts, etc. Examples of prerecorded presentations are television shows, movies, etc.

Figure 10:
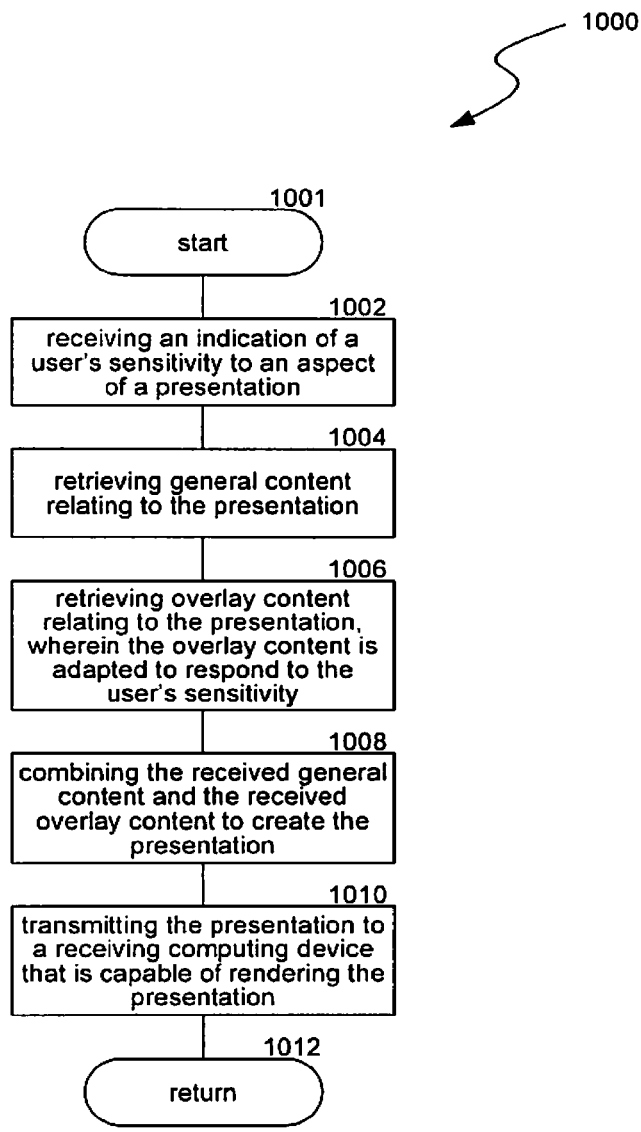
FIG. 10 is a flow diagram illustrating a method the technology may invoke in various embodiments.

FIG. 10 is a flow diagram illustrating a method 1000 the technology may invoke in various embodiments. In various embodiments, the technology can include a computer-readable storage device storing instructions executable by a computing device, the instructions including: receiving an indication of a user's sensitivity to an aspect of a presentation (block 1002); retrieving general content relating to the presentation (block 1004); retrieving overlay content relating to the presentation, wherein the overlay content is adapted to respond to the user's sensitivity (block 1006); combining the received general content and the received overlay content to create the presentation (block 1008); and transmitting the presentation to a receiving computing device that is capable of rendering the presentation (block 1010). The method begins at block 1001 and returns at block 1012. The computer-readable storage device can indicate one or more of a rating, the user's age, or the user's preference. At least a portion the overlay content can be combined with the general content by the receiving computing device or by a transmitting computing device.

Figure 11:
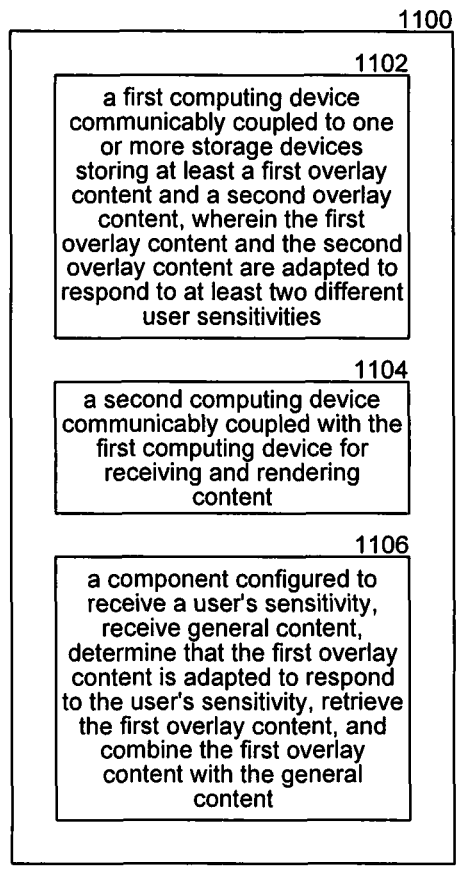
FIG. 11 is a block diagram illustrating components of the technology in various embodiments.

FIG. 11 is a block diagram illustrating components of the technology in various embodiments. In various embodiments, the technology includes a system for enabling augmented reality presentations 1100, including: a first computing device communicably coupled to one or more storage devices storing at least a first overlay content and a second overlay content, wherein the first overlay content and the second overlay content are adapted to respond to at least two different user sensitivities 1102; a second computing device communicably coupled with the first computing device for receiving and rendering content 1104; and, a component configured to receive a user's sensitivity, receive general content, determine that the first overlay content is adapted to respond to the user's sensitivity, retrieve the first overlay content, and combine the first overlay content with the general content 1106. The component may be configured to transmit the combined content to the second computing device. The component may be configured to receive the general content and the overlay content at the second computing device, and to combine the first overlay content with the general content at the second computing device. The system may include a component configured to transform the overlay content based on a current orientation of a subject over which overlay content is to be overlaid. The general content can be a live presentation or can be a stored prerecorded presentation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system including a processor and a memory device, comprising:
   receiving an indication of a user's level of sensitivity to a first aspect of a presentation;
   receiving general content relating to the presentation;
   receiving first overlay content relating to the presentation, wherein the first overlay content corresponds to the first aspect of the presentation and is adapted to respond to the user's level of sensitivity to the first aspect of the presentation;
   receiving second overlay content relating to the presentation, wherein the second overlay content corresponds to the first aspect of the presentation and is adapted to respond to the user's level of sensitivity to the first aspect of the presentation;
   identifying material in the general content relating to the presentation to which the user's level of sensitivity corresponds;
   selecting overlay content with which to overlay the received general content based on the user's level of sensitivity to the first aspect of the presentation, indicated by the received indication, wherein the selecting is from among the received first and second overlay content; transforming, as appropriate, the selected overlay content based on a current orientation of a subject over which overlay content is to be overlaid and a position of the user, the subject being part of the identified material in the general content, wherein the subject of the identified material in the general content is to be overlaid by the transformed overlay content,
   wherein the current orientation of the subject is independent of an orientation of a display device; and
   overlaying the received general content with the selected overlay content to create the presentation to alter the identified material in the general content relating to the presentation by the selected overlay content to respond to the user's level of sensitivity to the first aspect of the presentation.

2. The method of claim 1, wherein the receiving the indication includes receiving the user's age.

3. The method of claim 2, wherein the overlay content includes audio for the presentation.

4. The method of claim 2, wherein the overlay content includes video for the presentation.

5. The method of claim 1, further comprising:
   receiving an indication of a preference of the user with regard to the first aspect of the presentation.

6. The method of claim 5, wherein the preference is one or more of a language or a rating.

7. The method of claim 6, wherein the language preference relates to a natural language.

8. The method of claim 7, wherein the overlay content includes audio for the presentation.

9. The method of claim 6, wherein the language preference relates to use of offensive language.

10. The method of claim 9, wherein the overlay content includes audio for the presentation.

11. The method of claim 6, wherein the overlay content includes audio for the presentation.

12. The method of claim 6, wherein the overlay content includes video for the presentation.

13. The method of claim 5, wherein the overlay content includes audio for the presentation.

14. The method of claim 5, wherein the overlay content includes video for the presentation.

15. The method of claim 1, wherein the overlaying includes digitally overlaying clothing over the subject.

16. The method of claim 1, wherein the overlaying includes digitally removing clothing to cause the subject to appear to be nude or seminude.

17. The method of claim 1, wherein the overlaying includes replacing all visual and audible suggestions of an alcoholic beverage with that of a nonalcoholic beverage.

18. The method of claim 1, wherein the overlaying includes replacing the subject's face.

19. The method of claim 1, wherein the overlaying includes replacing the subject's voice.

20. The method of claim 1, wherein the overlaying includes replacing a musical soundtrack.

21. The method of claim 1, wherein the presentation is a live presentation.

22. The method of claim 1, wherein the presentation is a prerecorded presentation.

23. The method of claim 1, wherein the overlay content is dynamically generated after the material in the general content relating to the presentation to which the user is sensitive is identified.

24. The method of claim 1, wherein the overlay content is recorded prior to identification of the material in the general content relating to the presentation to which the user is sensitive is identified.

25. The method of claim 1, further comprising:
receiving an indication of the user's level of sensitivity to a second aspect of the presentation, the user's level of sensitivity to the second aspect of the presentation indicating how sensitive the user is to the second aspect of the presentation,
wherein the user's sensitivity to the second aspect of the presentation is not a preference.

26. The method of claim 1,
wherein the first aspect of the presentation is nudity,
wherein the overlaying the received general content with the received first overlay content alters the identified material in the general content, and
wherein the overlaying the received general content with the received second overlay content alters the identified material in the general content by adding clothing to the subject in the received general content.

27. The method of claim 1, wherein the selecting comprises:
selecting the received first overlay content in response to determining that the user's level of sensitivity to the first aspect of the presentation exceeds a first threshold and selecting the received second overlay content in response to determining that the user's level of sensitivity to the first aspect of the presentation exceeds a second threshold greater than the first threshold.

28. A non-transitory computer-readable storage device storing instructions executable by a computing device that, if executed by the computing device, causes the computing device to perform a method for presentation augmentation, the instructions comprising:
receiving an indication of a user's level of sensitivity to an aspect of a presentation;
retrieving general content relating to the presentation;
retrieving overlay content relating to the presentation based on the user's level of sensitivity to the aspect of the presentation, wherein the overlay content is adapted to respond to the user's level of sensitivity;
transforming, as appropriate, the retrieved overlay content based on a current orientation of a subject over which overlay content is to be overlaid and a position of the user, the subject being part of the general content, wherein the subject of the general content is to be overlaid by the transformed overlay content,
wherein the current orientation of the subject is independent of an orientation of a receiving computing device;
overlaying the retrieved general content with the retrieved overlay content to create the presentation to alter material of the retrieved general content relating to the presentation by the retrieved overlay content when the presentation is rendered; and
transmitting the presentation to the receiving computing device that is capable of rendering the presentation.

29. The non-transitory computer-readable storage device of claim 28, wherein the general content is overlaid with at least a portion of the overlay content by the receiving computing device.

30. A system for enabling augmented reality presentations, comprising:
a first computing device communicably coupled to one or more storage devices storing at least a first overlay content and a second overlay content, wherein the first overlay content is adapted to respond to a first level of sensitivity and the second overlay content is adapted to respond to a second level of sensitivity; and
a second computing device, communicably coupled to the first computing device, for receiving and rendering content;
the first computing device configured to:
receive, from a user, the user's level of sensitivity indicating how sensitive the user is to an aspect of the presentation,
receive general content,
retrieve the first overlay content,
retrieve the second overlay content,
transform, as appropriate, the first overlay content or the second overlay content based on a current orientation of a subject over which overlay content is to be overlaid and a position of the user, the subject being part of the general content, wherein the subject of the general content is to be overlaid by the transformed first or second overlay content,
wherein the current orientation of the subject is independent of an orientation of the second computing device,
overlay the general content with the first overlay content responsive to the determination that the received user's level of sensitivity indicates the first level of sensitivity, and overlay the general content with the second overlay content responsive to the determination that the received user's level of sensitivity indicates the second level of sensitivity.

31. The system of claim 30, wherein the first computing device is further configured to transmit the overlaid content to the second computing device.

32. The system of claim 30, wherein the first computing device is further configured to receive the general content and the first overlay content at the second computing device, and to overlay the general content with the first overlay content at the second computing device.

33. The system of claim 30, wherein the general content is a live presentation.

34. The system of claim 30, wherein the general content is a stored prerecorded presentation.

* * * * *